United States Patent
Shepherd et al.

(10) Patent No.: US 9,846,068 B2
(45) Date of Patent: Dec. 19, 2017

(54) MEASURING THE VOLUME OF FLUID IN A VESSEL

(71) Applicant: AIRBUS OPERATIONS LIMITED, Bristol (GB)

(72) Inventors: Alan Shepherd, Weston-Super-Mare (GB); Julian Duncan, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 53 days.

(21) Appl. No.: 14/397,127

(22) PCT Filed: Apr. 26, 2013

(86) PCT No.: PCT/GB2013/051066
§ 371 (c)(1),
(2) Date: Oct. 24, 2014

(87) PCT Pub. No.: WO2013/160691
PCT Pub. Date: Oct. 31, 2013

(65) Prior Publication Data
US 2015/0101403 A1 Apr. 16, 2015

(30) Foreign Application Priority Data
Apr. 27, 2012 (GB) .................................. 1207322.7

(51) Int. Cl.
| | |
|---|---|
| G01F 22/00 | (2006.01) |
| G01F 22/02 | (2006.01) |
| B64C 25/60 | (2006.01) |
| B64F 5/60 | (2017.01) |
| F16F 9/32 | (2006.01) |

(52) U.S. Cl.
CPC .............. *G01F 22/02* (2013.01); *B64C 25/60* (2013.01); *B64F 5/60* (2017.01); *F16F 9/3264* (2013.01); *G01F 22/00* (2013.01)

(58) Field of Classification Search
CPC ......... G01F 22/02; G01F 22/00; G01N 11/04; G01N 9/26; G01N 2030/522; G01N 33/0016; F16F 9/3264
See application file for complete search history.

(56) References Cited

U.S. PATENT DOCUMENTS

| | | |
|---|---|---|
| 4,956,996 A | 9/1990 | Morris |
| 5,001,924 A | 3/1991 | Walter et al. |
| 6,128,951 A * | 10/2000 | Nance .................. G01M 1/125 701/124 |

(Continued)

FOREIGN PATENT DOCUMENTS

| | | |
|---|---|---|
| CN | 201034684 Y | 3/2008 |
| CN | 102095466 A1 | 6/2011 |

(Continued)

OTHER PUBLICATIONS

International Search Report dated Jul. 8, 2013 in International Application No. PCT/GB2013/051066, filed Apr. 26, 2013.

(Continued)

*Primary Examiner* — R. A. Smith
*Assistant Examiner* — John M Royston
(74) *Attorney, Agent, or Firm* — Hauptman Ham, LLP (57) ABSTRACT

A method and apparatus is disclosed for measuring the volume of fluid in a variable volume vessel.

24 Claims, 7 Drawing Sheets

(56) References Cited

U.S. PATENT DOCUMENTS

| | | | | |
|---|---|---|---|---|
| 6,758,096 B1* | 7/2004 | Schon | ............... | F15B 1/08 |
| | | | | 73/708 |
| 2006/0220918 A1* | 10/2006 | Stockwell | ............... | B64C 25/00 |
| | | | | 340/960 |
| 2007/0068241 A1 | 3/2007 | Bains | | |
| 2009/0088983 A1* | 4/2009 | Bauer | ............... | F02D 41/0027 |
| | | | | 702/24 |
| 2012/0053783 A1* | 3/2012 | Nance | ............... | G01M 17/04 |
| | | | | 701/33.1 |

FOREIGN PATENT DOCUMENTS

| | | |
|---|---|---|
| EP | 1692470 A1 | 8/2006 |
| FR | 2793556 A1 | 11/2000 |
| WO | 98/26257 A1 | 6/1998 |
| WO | 9826257 A1 | 6/1998 |
| WO | 02/16883 A2 | 2/2002 |
| WO | 2005/052522 A1 | 6/2005 |
| WO | 2012/066482 A1 | 5/2012 |

OTHER PUBLICATIONS

Written Opinion dated Jul. 8, 2013 in International Application No. PCT/GB2013/051066, filed Apr. 26, 2013.
Search Report dated Aug. 26, 2012 in GB Application No. 1207322.7.
Office Action dated Sep. 13, 2016 Chinese Patent Application No. 201380034343.3.

* cited by examiner

MEASURING THE VOLUME OF FLUID IN A VESSEL

RELATED APPLICATIONS

The present application is a National Phase of International Application Number PCT/GB2013/051066, filed on Apr. 26, 2013, and claims priority from Great Britain Application Number 1207322.7, filed Apr. 27, 2012.

FIELD OF INVENTION

The present invention relates to a method and apparatus for measuring the volume of fluid in a variable volume vessel.

BACKGROUND OF THE INVENTION

Vehicle running gear commonly comprises one or more suspension springs damped by one or more shock absorbers. The suspension spring and damping functions may be provided in a single suspension strut. Examples of such a dual function strut are commonly founding in aircraft landing gear. In such struts the suspension spring is commonly provided by a gas spring and a hydraulic fluid provides damping. Both fluids may be contained in a single telescopic vessel or chamber within the strut. In use, a proportion of the gas or the hydraulic fluid escapes and needs to be replenished to a predetermined level so that the strut meets its required performance criteria with respect to suspension and shock absorption.

The level of each of the fluids in such a strut is often critical to ensure its correct performance. Servicing of such equipment therefore requires the accurate determination of the levels of the gas and the hydraulic fluid. Without such determination it is not possible to know whether a strut requires servicing or that it has been serviced correctly. In most struts the various fluid levels are not externally visible. As a result, accurate determination of the levels requires the introduction of suitable sensors or elaborate servicing techniques that involve moving the strut into a predetermined configuration and then following a prescribed refilling procedure. Such servicing procedures are time consuming, hazardous and difficult, especially if the strut is part of a large vehicle such as an aircraft.

SUMMARY OF THE INVENTION

An embodiment of the invention provides a method for measuring the volume of fluid in a variable volume vessel, the method comprising the steps of:
  recording data representing the temperature and pressure of gas from the vessel;
  modifying the volume of gas in the vessel by a measured volume;
  selecting a plurality of data points from the recorded temperature and pressure data from a region in the pressure data representing substantially constant volume of the vessel;
  calculating the volume of gas in the vessel from the measured volume and the temperature and pressure data for the selected data points; and
  outputting the calculated gas volume.

The measured volume may be introduced into the vessel. At least part of the introduced volume of gas may be extracted from the vessel. The vessel may be partially filled with a liquid and the method may comprise the further steps of: identifying the internal volume of the vessel; and calculating the volume of the liquid from the difference between the calculated volume of gas and the internal volume.

The vessel may comprise two or more parts arranged to move relative to each other and the interface between the two parts comprise a gas-tight seal providing friction against the relative movement of the two parts such that the volume of the vessel may vary, in response to changes in its internal pressure or loading, when the friction is overcome. The vessel may be externally loaded so as to pressurise the vessel. The gas may be extracted from the vessel by a displacement pump. The pump may be operable by a control system, the control system being further operable to record the pressure and temperature data, select the data points, calculate the volume of gas and output the calculated volume.

The gas may be arranged to provide a gas spring. The liquid may be arranged to provide damping for a gas spring. The vessel may comprise a suspension strut for a vehicle. The vehicle may be an aircraft.

The region in the pressure data representing substantially constant volume of the vessel may be identified by the rate of change of the pressure data being substantially linear. The region in the pressure data representing substantially constant volume of the vessel may be identified using data representing an externally measured dimension for the vessel.

Another embodiment provides apparatus for measuring the volume of fluid in a variable volume vessel, the apparatus being operable to:
  record data representing the temperature and pressure of gas from the vessel;
  modify the volume of gas in the vessel by a measured volume;
  select a plurality of data points from the recorded temperature and pressure data from a region in the pressure data representing substantially constant volume of the vessel;
  calculate the volume of gas in the vessel from the measured volume and the temperature and pressure data for the selected data points; and
  output the calculated gas volume.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
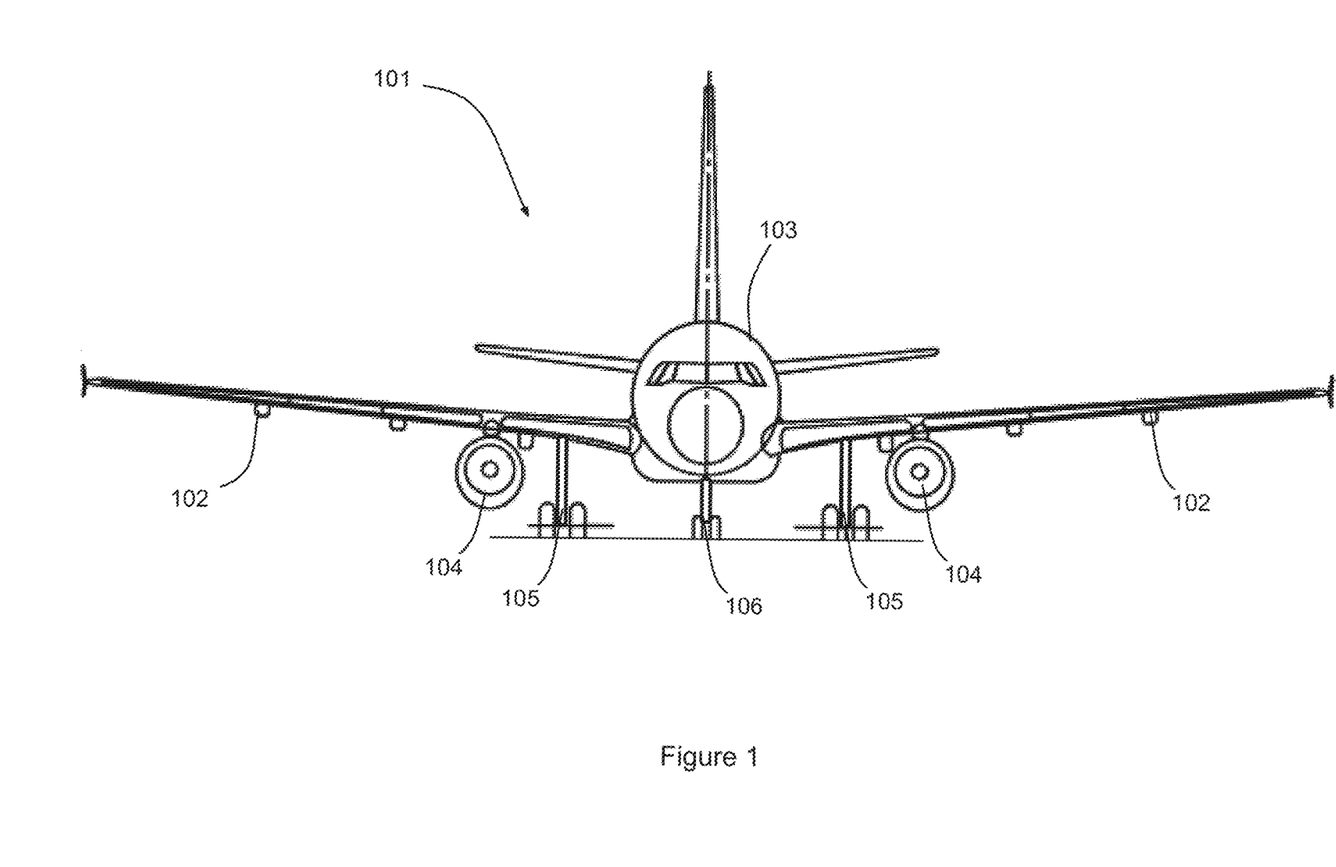
FIG. 1 is a schematic front view of an aircraft.

With reference to FIG. 1, an aircraft 101 comprises a pair of wings 102 faired into a fuselage 103. The wings each carry an engine 104. The aircraft 101 is supported on the ground by running gear in the form of a set of landing gear comprising main landing gear 105 and a nose landing gear 106. Each of the landing gears 105, 106 are provided with suspension and shock absorption functions.

Figure 2:
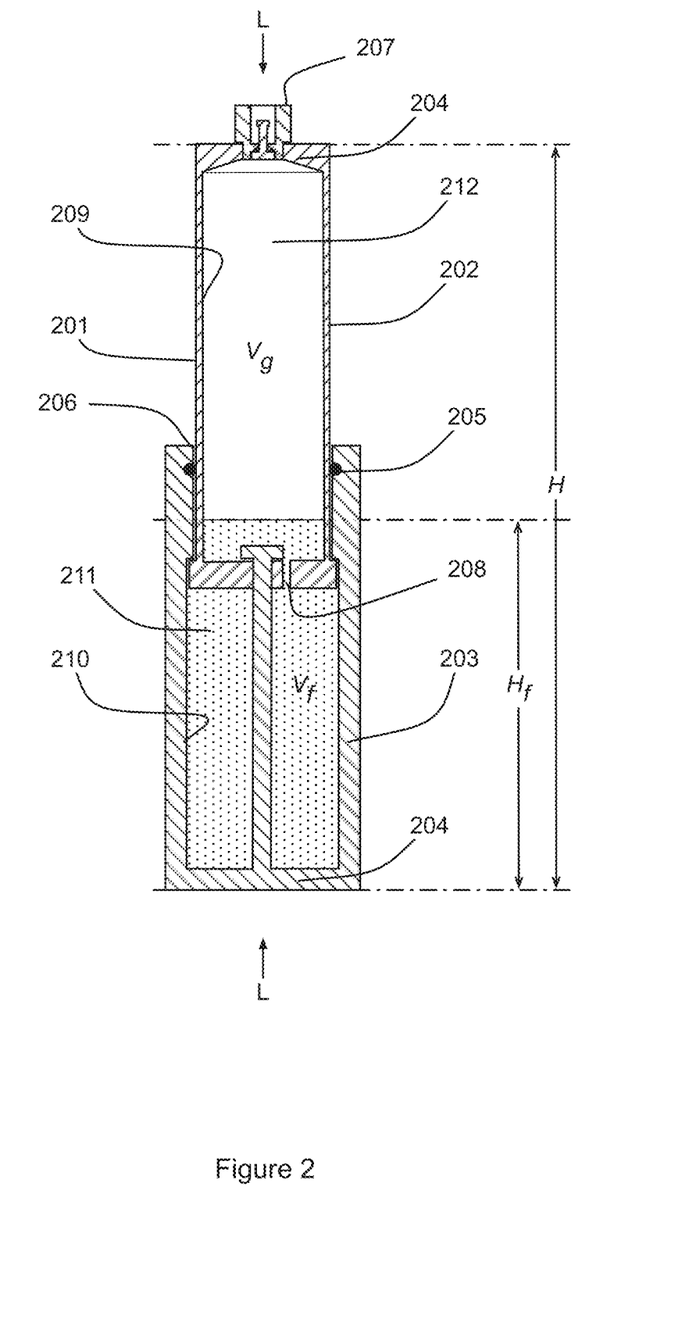
FIG. 2 is a cross sectional view of a landing gear strut in the aircraft of FIG. 1.

With reference to FIG. 2, each landing gear 105, 106 comprises a suspension strut 201 comprising a hollow generally cylindrical vessel having a hollow cylindrical upper part 202 and a hollow cylindrical lower part 203. The respective distal ends 204 of the upper and lower 202, 203 parts are closed. The upper part 202 is arranged to slide within the lower part 203 so that the strut 201 is telescopic. A fluid-tight seal 205 is provided on the inner surface of the lower part 203 generally adjacent its proximal open end 206. A valve 207 is fitted in the closed end 204 of the upper part 202 and arranged to enable the controlled insertion or extraction of fluid into or out of the interior chambers of the strut 201.

The opening 208 of the proximal open end of the upper part is restricted so as to provide resistance for fluid flow between the respective interior chambers 209, 210 of the two parts 202, 203. The interior chambers 209, 210 are filled with a liquid in the form of hydraulic fluid 211 and a gas 212 in the form of nitrogen. The gas is arranged to provide a gas spring thus providing the suspension function of the strut 201. The hydraulic fluid is forced through the restrictive opening 208 by the relative sliding of the two parts 202, 203 thereby acting to damp the relative movement and thus provides the shock absorption function of the strut 201.

In FIG. 2, the strut 201 is shown compressed by a load L to a height H. The hydraulic fluid is provided at its required level $H_f$, which equates to a liquid volume $V_f$. The remaining volume is filled with gas at a pressure $P_g$. Assuming the hydraulic fluid level $H_f$ is correct, the compression of the strut 201, and hence its height H, is a function of the pressure $P_g$ and the temperature $T_g$ of the gas 212. Therefore, to enable the correct servicing of the strut 201, servicing data (not shown) is provided which indicates the correct height H for a given pressure $P_g$ and the temperature $T_g$ of the gas 212. Nitrogen 212 can then be inserted or extracted via the valve 207 to raise or lower the strut 201 until the correct height H is achieved.

Figure 3:
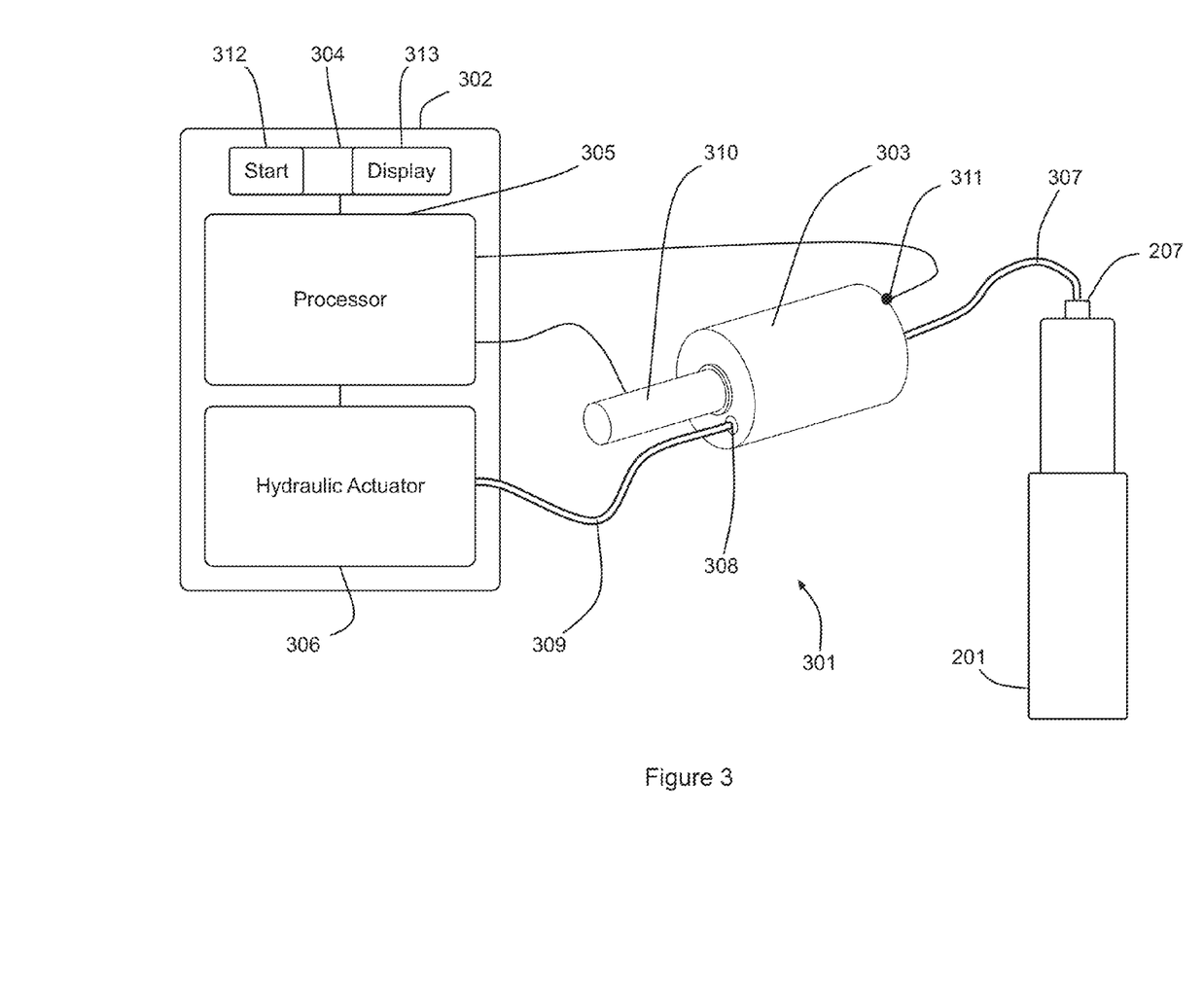
FIG. 3 is a schematic view of a volume measuring system for determining the volume of fluid in the strut of FIG. 2.

With reference to FIG. 3, apparatus 301 arranged to measure the volume of a gas in a vessel, which in the present embodiment, is the volume $V_g$ of nitrogen 212 in the strut 201. The apparatus 301 comprises a control unit 302 and displacement pump means in the form of a gas syringe 303. The control unit 302 comprises a user interface 304, a processor 305 and a hydraulic actuator 306. The syringe 303 has a fluidic connection to the valve 207 of the strut 201 via a short hose 307. The syringe 303 comprises a hydraulic input 308 connected to the hydraulic actuator 306 by a hydraulic hose 309. The hydraulic input 308 enables the syringe 303 to be actuated by the hydraulic actuator 306 to insert or extract gas 212 to or from the strut 201 via the valve 207.

The syringe 303 further comprises a linear variable displacement transducer (LVDT) 310 and a pressure and temperature (P/T) sensor 311. The LVDT 310 is arranged to provide data representing the volume of gas 212 contained in the syringe 303 and inputs this data to the processor 305. The P/T sensor 311 collects temperature and pressure data for the gas within the syringe 303 and inputs this data to the processor 305.

The user interface (UI) 304, comprises a start button 312 and a display 313. The start button 312 is arranged to enable a user to instruct the apparatus 301 to measure the volume of gas 212 in the attached strut 201. The display 313 is arranged to display the measured volume to the user. The processor 305 is arranged, in response to user input via the start button 312, to use the hydraulic actuator 306 to operate the syringe 303 so as to extract a predetermined measured volume of gas from the strut 201 and then to return extracted gas to the strut 201. During this process the processor is arranged to record the temperature and pressure data received from the P/T sensor 311. From this recorded pressure and temperature data and the extracted and returned measured volume of gas, the processor is then arranged to calculate the volume of the gas 212 in the strut 201 and display this to the user via the display 313.

Figure 4:
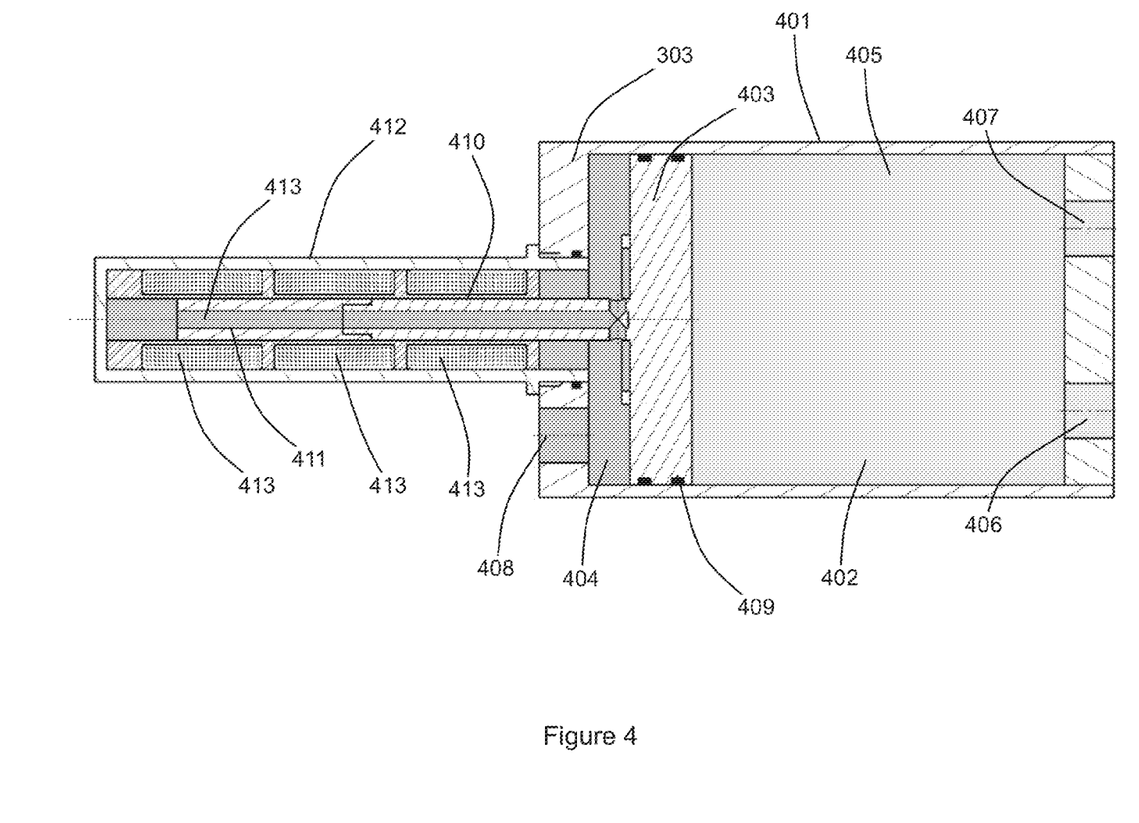
FIG. 4 is a cross sectional view of a syringe in the system of FIG. 3.

With reference to FIG. 4, the syringe 303 comprises a generally cylindrical hollow body member 401 defining an internal chamber 402. A piston 403 is slidably arranged within the chamber 402 dividing the chamber 402 into an actuation chamber 404 on one side of the piston 403 and an extraction chamber 405 on the other side of the piston 403.

The extraction chamber 405 comprises a gas port 406 for attachment of the short hose 307 for connecting to the valve 207 of the strut 201. The extraction chamber 405 also comprises a P/T sensor port 407 into which the P/T sensor 311 is fixed with a gas-tight seal. The actuation chamber 404 comprises a hydraulic port 408 for connection of the hydraulic hose 309 to the hydraulic actuator 306.

The piston 403 carries two circumferential seals 409 to ensure a gas tight slidable seal between the actuation and extraction chambers 404, 405. The piston 403 is also carries a rod 410 comprising a ferromagnetic portion 411. The rod 410 is housed in hollow sensor body member 412 fixed at the actuation chamber end of the body member 401 and in fluid communication with the actuation chamber 404. The rod 410 further comprises an internal conduit 413 arranged to provide fluid to flow between the actuation chamber 404 and the interior distal end of the sensor body member 412. The sensor body member 412 carries a set of three LVDT coils 413 that surround the rod 410. Together the ferromagnetic portion 411 of the rod 410 and the LVDT coils 413 comprise the LVDT 310 that, once calibrated appropriately, detects the position of the piston 403 and thus the volume of the extraction chamber 405 at any given time. The syringe 303 is operated under the control of the processor 305 by the pumping of hydraulic fluid into or out of the actuation chamber 404 so as to controllably vary the volume of the extraction chamber 405. At any time the volume of the extraction chamber is indicated by the data from the LVDT 310.

Figure 5:
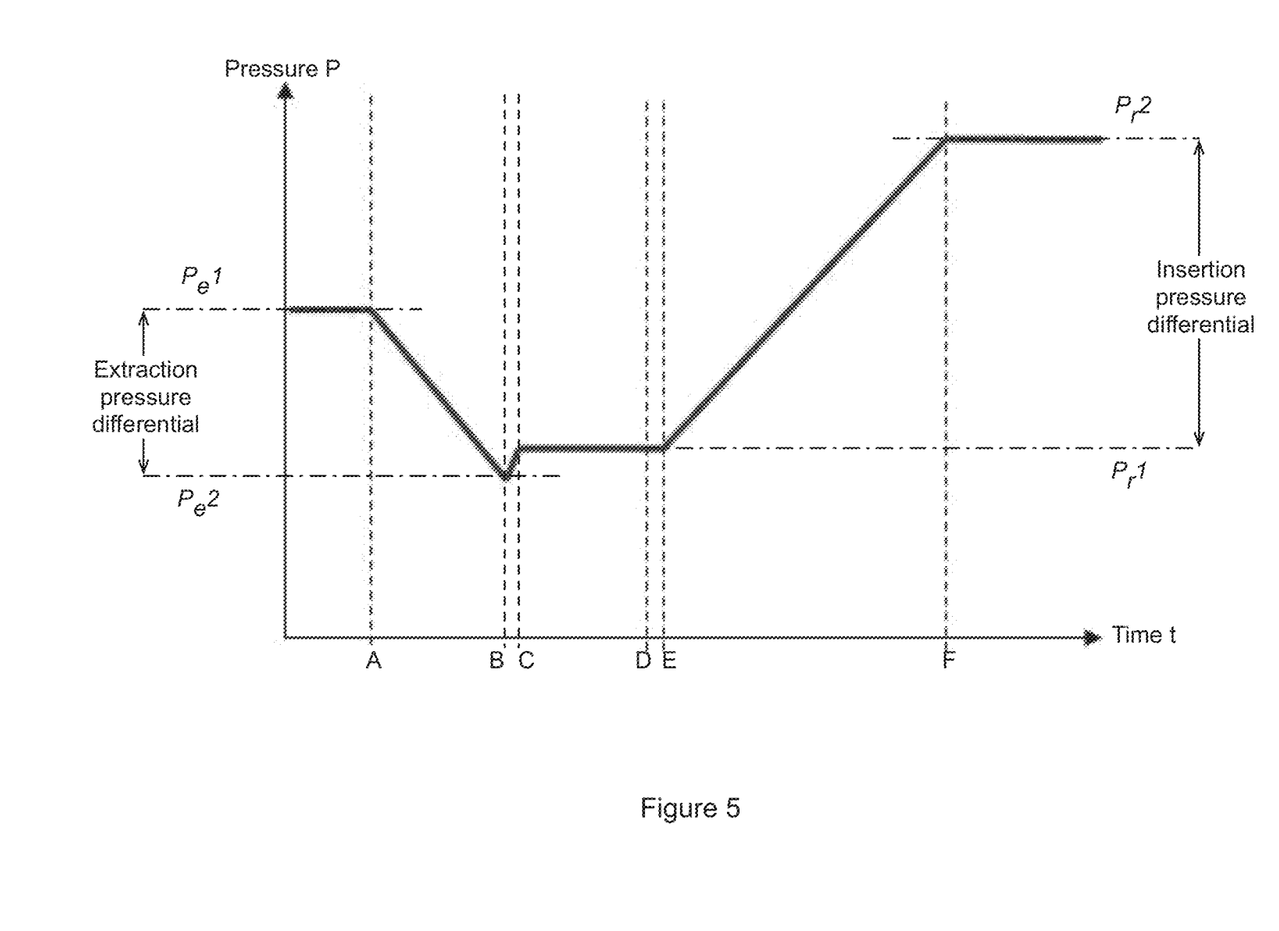
FIG. 5 is a graph showing the variation of pressure in the landing gear strut of FIG. 2 during the operation of the volume measuring system of FIG. 3.

In the present embodiment, with reference to FIG. 5, the volume measurement process performed by the apparatus 301 comprises an extraction phase in which gas is extracted from the strut 201 into the syringe 303 and an insertion phase in which gas is reinserted from the syringe 303 back into the strut 201. The graph 501 of FIG. 5 charts the variation in pressure as measure by the P/T sensor 311 during the volume measurement process on the strut 201. The strut 201 is one of the three supporting the aircraft 101 on the ground and thus, in the present embodiment, is under a compressive load. During the initial part of extraction phase from point A to point B the measured pressure drops as the gas 212 expands from the strut 201 into the syringe 303. At point B the external loading on the strut 201 overcomes the friction in the seals 205 causing the strut 201 to move and recompress the gas 212 at point C under the weight of the aircraft 101. From point C the further extraction of gas 212 from the strut 201, in which the friction in the seals 205 has been overcome, results in little further pressure change because the strut 201 telescopes further accordingly until the extraction phase ends at point D.

The insertion phase is initiated at point E and, as a result of the resistance of the seals 205 to any change in direction of the telescoping of the strut 201, the pressure increases immediately. In the present embodiment, during the insertion phase the friction in the seals 205 and the weight of the aircraft 101 act in the same direction and thus more gas 212 can be reinserted into the strut 201 before the strut 201 is likely to expand. In the present example shown in the graph 501 all of the extracted gas 212 is reinserted before the combination of the seal friction and the aircraft weight is overcome so as to cause any expansion of the strut 201.

The data collected for the above process represents a maximum pressure differential in the extraction phase falling from an initial pressure $P_e1$ at point A to a low of $P_e2$ at point B when the seals 205 slip. The data further represents a maximum pressure differential in the insertion phase rising from an initial pressure $P_i1$ at point E to a high of $P_i2$ at point F. The phase demonstrating the greatest pressure differential is selected since this provides greatest accuracy for the volume measurement. As will be understood by those skilled in the art, the pressure differentials are dependent on the given landing gear and the extracted volume. In the present example, since the strut 201 is under compression, the pressure differential $\delta P_i$ in the insertion phase will be greater than the pressure differential in the extraction phase $\delta P_e$. The rate of change in the pressure is dependent on rate of operation of the syringe 303.

In the portions of the phases between points A and B and points E and F the friction of the seals 205 has not been overcome for a given direction of movement and thus the strut 201 comprises a fixed volume vessel. Once the seal friction is overcome the strut 201 has variable volume. In the present embodiment, the processor 305 is arranged to use the ideal gas law to determine the gas volume $V_g$ of the strut and thus only the fixed vessel portion of the data is used. However, the friction in the seals 205 may be overcome at any point in either the extraction phase or insertion phase and will result in the respective contraction or expansion of the strut 201. In the present embodiment, the processor 305 is arranged to analyse the recorded pressure data from the P/T sensor 311 to identify points at which the friction, in the form of stiction, in the seals 205 is overcome. In the present embodiment, the pressure data is analysed to identify the jump in pressure resulting from the overcoming of the stiction in the seals 205. In FIG. 5, such a pressure jump can be identified between points B and C. Once the pressure jump is identified a boundary point is selected at a predetermined spacing prior to the jump to delineate the fixed vessel portion of the data.

The ideal gas law can be stated in equation 1 as follows:

$$V_1 = \frac{P_2 V_S T_1}{P_1 T_2 - P_2 T_1}$$

Where:
$V_s$=Extracted volume;
$V_1$=Chamber volume;
$P_1$=Initial Pressure;
$P_2$=Final Pressure;
$T_1$=Initial Temperature; and
$T_2$=Final Temperature.
Using the extracted volume indicated by the LVDT 310 and the start and end temperatures and pressures from the stored data retrieved from the P/T sensor 311 the processor 305 is arranged to calculate the chamber volume $V_1$ that equates to the volume $V_g$ of gas 212 in the strut 201 and to display this measurement to the user via the display 313. Furthermore, given servicing data providing a correlation between the height of the strut 201 and its overall internal volume, the user can use the provided volume $V_g$ of gas 212 and the measured height H of the strut 201 to calculate the volume $V_f$ of hydraulic fluid 211. Thus the user can service the strut 201 if necessary by adjusting the volumes of hydraulic fluid 211 and gas 212 accordingly.

Figure 6:
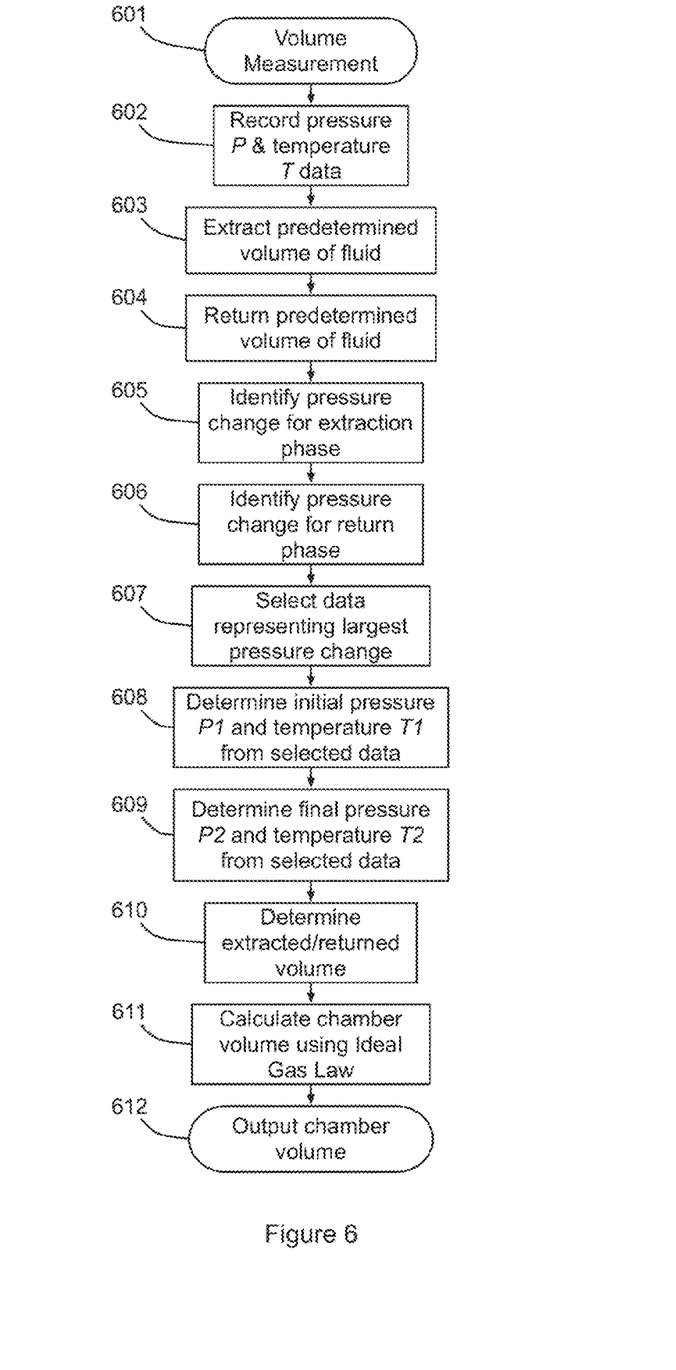
FIG. 6 is a flow chart illustrating processing performed by the volume measuring system of FIG. 3 when determining the volume of fluid in the strut of FIG. 2.

The processing performed by the processor 305 when calculating the volume $V_g$ of gas 212 in a strut 201 will now be described further with reference to the flow chart of FIG. 6. Processing is initiated at step 601 in response to a user command via the start button 312 and processing moves to step 602. At step 602 recording of the data from the P/T sensor 311 and the LVDT 310 is initiated and processing moves to step 603. At step 603 the syringe 303 is operated via the hydraulic actuator 306 to extract a measured volume of gas 212 from the strut 201 and processing moves to step 604. At step 604 the measured volume of gas 212 is reinserted to the strut and processing moves to step 605. At step 605 the pressure change for the extraction phase is identified from the recorded data, excluding the data regions indicating any volume change in the strut 201 as a result of the seal friction being overcome and processing moves to step 606. At step 606 the pressure change for the insertion phase is identified from the recorded data excluding the data regions indicating any volume change in the strut 201 as a result of the seal friction being overcome and processing moves to step 607. At step 607 the identified pressure data representing the largest pressure differential is selected and processing moves to step 608. At step 608 the relevant initial pressure $P_1$ and initial temperature $T_1$ are determined from the recorded data and processing moves to step 609. At step 609 the relevant final pressure $P_2$ and final temperature $T_2$ are determined from the recorded data and processing moves to step 610. At step 610 the magnitude of the extracted or injected volume Vs is determined and processing moves to step 611. At step 611 the volume of gas $V_g$ is calculated from equation 1 as described above and processing moves to step 612. At step 612 the calculated volume $V_g$ is displayed to the user via the display 313 and processing then ends.

Figure 7:
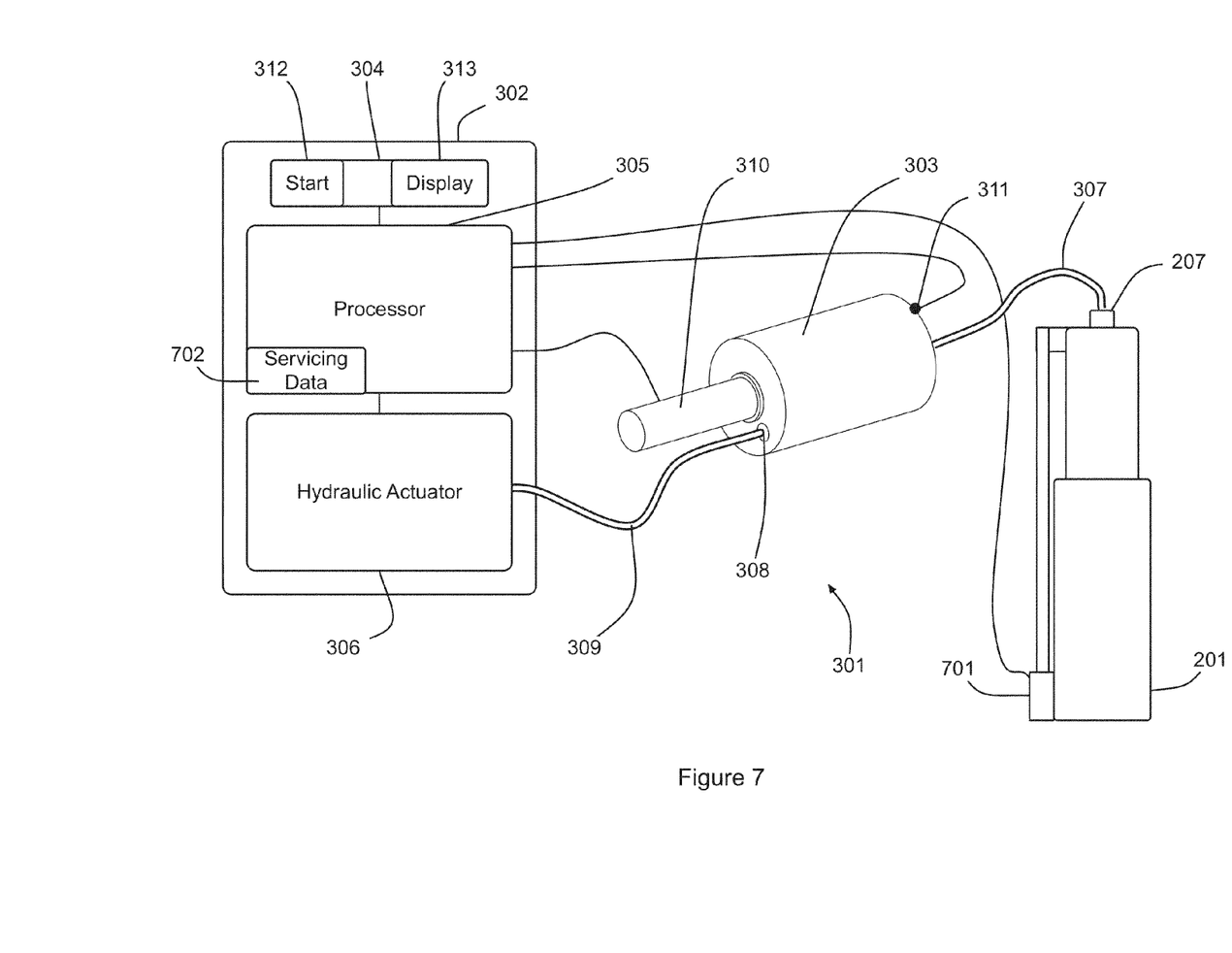
FIG. 7 is a schematic view of a volume measuring system in accordance with another embodiment of the invention for determining the volume of fluid in the strut of FIG. 2.

In another embodiment, with reference to FIG. 7, the apparatus 301 is provided with a height sensor 701 for measuring the height of the strut 201. The apparatus is further provided with servicing data 702 representing the overall internal volume of the strut 201 for a given measured height. The apparatus 301 is arranged to automatically calculate the volume $V_f$ of hydraulic fluid based on the measured gas volume $V_g$ and to display the calculated $V_f$ to the user. Thus the user can service the strut 201 if necessary by adjusting the volume of hydraulic fluid. Once the hydraulic fluid has been serviced to its required level, the amount of gas can then also be adjusted accordingly to the correct pressure defined in the servicing data for the relevant measured temperature.

In another embodiment the temperature and pressure data is recorded for the gas reinsertion phase only and this data only is used for the calculation of the volume of gas in the vessel.

In a further embodiment, the volume of gas extracted or reinserted is not measured and thus the LVDT or equivalent sensor is omitted. Instead, the syringe is calibrated to extract or insert a predetermined fixed volume. This fixed volume is then used in the calculation of the vessel gas volume via the ideal gas law equation.

In another embodiment, the processor is arranged to analyse the recorded pressure data from the P/T sensor 311 to identify points at which the friction, in the form of stiction, in the seals 205 is overcome by identifying the point at which the pressure stops changing with respect to continued extraction or insertion of gas as shown in the region from C to D in the graph of FIG. 5. In a further embodiment, the height of the strut is physically monitored for any change in height or length so as to determine the point at which the volume of the strut changes and a boundary point in the pressure data is identified and recorded accordingly.

As will be understood by those skilled in the art, embodiments of the invention may be applied to any pressurised or small volume vessel containing gas, where the extracted volume is a small proportion of the volume being measured. The vessel may be partially or fully filled with gas.

As will be understood by those skilled in the art, any suitable displacement pump may be used for extracting or inserting gas in embodiments of the invention. The gas used for insertion may be provided exclusively or partially from the extracted gas. The gas used for insertion may be independent of the extracted gas.

In a further embodiment, once the volume of the vessel has been calculated, the volume of the hose connecting the syringe to the vessel is taking into account by subtracting its volume from the calculated volume to give the volume in the vessel. Unless the volume of the hose is fixed, this element of the calculation must be recalibrated if the hose is changed. In another embodiment, this subtracted volume also includes the volumes in the valves or other connectors to improve accuracy. As will be understood by those skilled in the art, these equipment volumes are lost from the measured vessel as a result of the measurement process when the equipment is removed. Such lost equipment volumes are minimised by, for example, reducing volume of the connecting hose and other relevant elements.

Embodiments of the invention enable the volume of gas in a vessel to be measured accurately. Measurement of the pressure change is performed for extraction and insertion of a predetermined volume of gas from or into the vessel and the largest resulting pressure differential selected thus improving accuracy. Analysis of the recorded pressure data enables changes in volume of the vessel during measurement to be identified and only the data associated with the vessel at a fixed volume selected for the volume calculation. Once the system is connected to the vessel, by the connection of the short hose 307 to the valve 207 of the strut 291 in the embodiment above, and the start command input by the user, the measurement of the volume of gas in the vessel is automatic.

The hydraulic operation of the syringe as described above is advantageous in that the pressure differential across the piston is small and only needs to be sufficient to overcome friction in the seal. As will be understood by those skilled in the art, the actuation of the syringe may be performed by any suitable mechanism such as rack & pinion or a solenoid.

As will be understood by those skilled in the art, the operation of embodiments of the invention may be triggered by any suitable means and is not limited to a user initiated start command. For example, the operation of embodiments of the invention may be initiated automatically in response to the detection of a predetermined trigger such as the connection of the equipment to a pressurized vessel or may be initiated by a command or instruction form another apparatus or system.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A method for measuring the volume of fluid in a variable volume vessel comprising two or more parts arranged to move relative to each other, the method comprising the steps of:

extracting a measured volume of gas from the variable volume vessel into an extraction chamber in an extraction phase to decrease the pressure of the gas in the variable volume vessel;

recording pressure data and temperature data representing the temperature and pressure of gas in the variable volume vessel during the extraction phase;

inserting the measured volume of gas in the extraction chamber into the variable volume vessel in an insertion phase to increase the pressure of the gas in the variable volume vessel;

recording pressure data and temperature data representing the temperature and pressure of gas in the variable volume vessel during the insertion phase;

determining, from the recorded temperature and pressure data, which of the insertion phase and the extraction phase corresponds to the maximum pressure change for the gas in the variable volume vessel;

identifying a region in the recorded temperature and pressure data representing substantially constant volume of the variable volume vessel due to stiction between the two or more moving parts during the determined one of the insertion phase and the extraction phase;

calculating the volume of gas in the variable volume vessel from the measured volume and the temperature and pressure data based on a plural of data points selected from the identified region; and outputting the calculated gas volume.

2. A method according to claim 1 in which the variable volume vessel is partially filled with a liquid and the method comprises the further steps of:

identifying an internal volume of the variable volume vessel; and calculating the volume of the liquid from the difference between the calculated volume of gas and the internal volume.

3. A method according to claim 1 in which an interface between the two or more parts comprises a gas-tight seal providing friction against the relative movement of the two or more parts such that the volume of the variable volume vessel may vary, in response to changes in its internal pressure or loading, when the friction is overcome.

4. A method according to claim 1 in which the variable volume vessel is externally loaded so as to pressurise the variable volume vessel.

5. A method according to claim 1 in which the gas is extracted from the variable volume vessel by a displacement pump.

6. A method according to claim 5 in which the displacement pump is operable by a control system, the control system being further operable to record the pressure and temperature data, select the data points, calculate the volume of gas and output the calculated volume.

7. A method according to claim 1 in which the gas is arranged to provide a gas spring.

8. A method according to claim 2 in which the liquid is arranged to provide damping for a gas spring.

9. A method according to claim 1 in which the variable volume vessel comprises a suspension strut for a vehicle.

10. A method according to claim 9 in which the vehicle is an aircraft.

11. A method according to claim 1 in which the region in the pressure data representing substantially constant volume of the variable volume vessel is identified by the rate of change of the pressure data being substantially linear.

12. A method according to claim 1 in which the region in the pressure data representing substantially constant volume of the variable volume vessel is identified using data representing an externally measured dimension for the variable volume vessel.

13. Apparatus for measuring the volume of fluid in a variable volume vessel comprising two or more parts arranged to move relative to each other, the apparatus, comprising:
    a displacement pump to extract a measured volume of gas from the variable volume vessel into an extraction chamber in an extraction phase to decrease the pressure of the gas in the vessel, and insert the measured volume of gas in the extraction chamber into the variable volume vessel in an insertion phase to increase the pressure of the gas in the vessel, and
    a control system configured to record pressure data and temperature data representing the temperature and pressure of gas in the variable volume vessel during the extraction phase;
    record pressure data and temperature data representing the temperature and pressure of gas in the variable volume vessel during the insertion phase;
    determine, from the recorded temperature and pressure data, which of the insertion phase and the extraction phase corresponds to the maximum pressure change for the gas in the variable volume vessel;
    identify a region in the recorded temperature and pressure data representing substantially constant volume of the variable volume vessel due to stiction between the two or more moving parts during the determined one or the insertion phase and the extraction phase;
    calculate the volume of gas in the variable volume vessel from the measured volume and the temperature and pressure data based on a plurality of data points selected from the identified region; and
    output the calculated gas volume.

14. Apparatus according to claim 13 in which the variable volume vessel is partially filled with a liquid and the apparatus is further operable to:
    identify an internal volume of the variable volume vessel; and
    calculate the volume of the liquid from the difference between the calculated volume of gas and the internal volume.

15. Apparatus according to claim 13 in which an interface between the two or more parts comprises a gas-tight seal providing friction against the relative movement of the two or more parts such that the volume of the variable volume vessel may vary, in response to changes in its internal pressure or loading, when the friction is overcome.

16. Apparatus according to claim 13 in which the variable volume vessel is externally loaded so as to pressurise the variable volume vessel.

17. Apparatus according to claim 13 in which the gas is extracted from the variable volume vessel by the displacement pump.

18. Apparatus according to claim 17 in which the displacement pump is operable by a control system, the control system being further operable to record the pressure and temperature data, select the data points, calculate the volume of gas and output the calculated volume.

19. Apparatus according to claim 13 in which the gas is arranged to provide a gas spring.

20. Apparatus according to claim 14 in which the liquid is arranged to provide damping for a gas spring.

21. Apparatus according to claim 13 in which the vessel comprises a suspension strut for a vehicle.

22. Apparatus according to claim 21 in which the vehicle is an aircraft.

23. Apparatus according to claim 13 in which the region in the pressure data representing substantially constant volume of the variable volume vessel is identified by the rate of change of the pressure data being substantially linear.

24. Apparatus according to claim 13 in which the region in the pressure data representing substantially constant volume of the variable volume vessel is identified using data representing an externally measured dimension for the variable volume vessel.

* * * * *